(12) United States Patent
Gavrilov et al.

(10) Patent No.: US 11,226,879 B2
(45) Date of Patent: Jan. 18, 2022

(54) FENCING NON-RESPONDING PORTS IN A NETWORK FABRIC

(71) Applicant: International Business Machines Corporation, Armonk, NY (US)

(72) Inventors: Constantine Gavrilov, Rishon Le-Zion (IL); Eli Koren, Tel Aviv (IL)

(73) Assignee: International Business Machines Corporation, Armonk, NY (US)

(*) Notice: Subject to any disclaimer, the term of this patent is extended or adjusted under 35 U.S.C. 154(b) by 25 days.

(21) Appl. No.: 16/870,598

(22) Filed: May 8, 2020

(65) Prior Publication Data
US 2021/0349794 A1 Nov. 11, 2021

(51) Int. Cl.
*G06F 11/00* (2006.01)
*G06F 11/16* (2006.01)
*G06F 11/14* (2006.01)
*G06F 11/30* (2006.01)
*G06F 9/48* (2006.01)

(52) U.S. Cl.
CPC ........ *G06F 11/1625* (2013.01); *G06F 9/4881* (2013.01); *G06F 11/1441* (2013.01); *G06F 11/3006* (2013.01)

(58) Field of Classification Search
CPC ............ G06F 11/1625; G06F 11/1441; G06F 11/3006; G06F 11/0709; G06F 11/3051; G06F 11/0703; G06F 11/0757; G06F 9/4881
See application file for complete search history.

(56) References Cited

U.S. PATENT DOCUMENTS

| 7,023,811 | B2 | 4/2006 | Pinto |
| 7,872,982 | B2 | 1/2011 | Atkins et al. |
| 8,127,003 | B2 | 2/2012 | Glaeser et al. |
| 9,900,293 | B2 | 2/2018 | Johnsen et al. |
| 2003/0101367 | A1* | 5/2003 | Bartfai ............... G06F 11/0709 714/4.3 |

(Continued)

FOREIGN PATENT DOCUMENTS

| CN | 104798349 A | 7/2015 |
| CN | 109450666 A | 3/2019 |

OTHER PUBLICATIONS

Guay et al., "A Scalable Method for Signalling Dynamic Reconfiguration Events with OpenSM," 11th IEEE/ACM International Symposium on Cluster, Cloud and Grid Computing, pp. 332-341, 2011.

(Continued)

*Primary Examiner* — Joseph D Manoskey
(74) *Attorney, Agent, or Firm* — Zilka-Kotab, P.C.

(57) ABSTRACT

A computer-implemented method according to one aspect includes determining whether an operating system of a node of a distributed computing environment is functioning correctly by sending a first management query to the node; in response to determining that the operating system of the node is not functioning correctly, determining whether the node has an active communication link by sending a second management query to ports associated with the node; and in response to determining that the node has an active communication link, resetting the active communication link for the node by sending a reset request to the ports associated with the node.

25 Claims, 8 Drawing Sheets

(56) References Cited

U.S. PATENT DOCUMENTS

| | | | |
|---|---|---|---|
| 2005/0021751 A1* | 1/2005 | Block | G06F 9/54 |
| | | | 709/225 |
| 2008/0192654 A1 | 8/2008 | Block et al. | |
| 2010/0284269 A1* | 11/2010 | Zhu | H04L 45/00 |
| | | | 370/221 |
| 2012/0219014 A1 | 8/2012 | Glaeser | |
| 2013/0262937 A1 | 10/2013 | Sridharan et al. | |
| 2018/0234507 A1* | 8/2018 | Tamir | H04L 49/9068 |
| 2019/0123955 A1* | 4/2019 | Chan | H04L 51/38 |
| 2019/0173808 A1 | 6/2019 | Johnsen et al. | |
| 2020/0084088 A1 | 3/2020 | Zhu et al. | |
| 2020/0092193 A1 | 3/2020 | Tillotson et al. | |

OTHER PUBLICATIONS

CSRC, "Cloud Computing," Computer Security Resource Center, Oct. 2017, 3 pages, retrieved from https://csrc.nist.gov/projects/cloud-computing.

Mell et al., "The NIST Definition of Cloud Computing," Version 15, Oct. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

Anonymous, "NIST Cloud Computing Program," NIST, Information Technology Laboratory, Nov. 13, 2013, pp. 1-2, retrieved from www.nist.gov/itl/cloud/.

International Search Report and Written Opinion from PCT Application No. PCT/IB2021/053435, dated Aug. 12, 2021.

* cited by examiner

FENCING NON-RESPONDING PORTS IN A NETWORK FABRIC

BACKGROUND

The present invention relates to distributed computing systems, and more particularly, this invention relates to identifying and addressing non-responding ports of nodes in a distributed computing system.

Modern distributed computing environments perform computing tasks utilizing an efficient sharing of computing and storage resources. These environments utilize a high-speed, low-latency communications medium to distribute data to a plurality of interconnected nodes for processing. However, problems arise when one or more nodes malfunction but still receive incoming data for processing. This may result in a situation where the entire distributed computing environment needs to be power cycled to continue processing in an optimized fashion. Traditional means for identifying and removing failed nodes do not accurately identify and respond to malfunctioning nodes with active communication ports.

More specifically, modern fast Interconnect solutions support high-speed data communication. At such speeds, a port that does not see a physical link problem and is capable of negotiating the correct speed without encountering errors will quickly cause congestion in the network fabric and application flows if it is not able to consume data at the same speed. For example, a host channel adapter (HCA) may have a problem with transferring data to the host memory, because it has hardware problems with peripheral component interconnects (PCI) transfers, or because its direct memory access (DMA) hardware has a malfunction.

Similar problems may occur if an entire node malfunctions and the system firmware preempts the operating system from running while handling a hardware fault. If the fault handler takes a significant time to run, the network adapter queue will become full very quickly and it will not be able to receive new packets. On the other hand, if a local or remote HCA malfunction prevents applications from sending and receiving data with required integrity and speed, applications may be prevented from completing transactions.

A situation becomes critical when the entire fabric malfunctions due a presence of a crashed node with links in an active state. For many practical failure scenarios, Interconnect links may go down quickly when an operating system cannot execute. Additionally, many Interconnect fabrics are reliable networks that use hardware credit flow control mechanisms and have timeouts for head of queue packets and all packets within the transmit queue. The transport standards cope with a component that is present in the network but is not able to send or receive packets.

The standards are defined such that a presence of a malfunctioning component (e.g., one that is not releasing credits because it is not able to receive data) shall not block the entire fabric for a long time leading to its collapse. However, if one piece of software is within a critical section, where it needs to communicate with a failed destination again and again until it sees an error or succeeds in order to leave the critical section, it may prevent other pieces of software (like cluster grid logic) to communicate, because all transmit port credits are consumed by a failed component repeatedly. Thus, the software is both unable to provide I/O services (because it is in a critical section) and is also unable to abort the critical section, because the communication associated with the critical section blocks other traffic that may detect the failure and communicate the failure across the grid.

Additionally, real life testing scenarios show that network equipment often fails to properly implement the transport standards of releasing the transmit credits consumed by non-responding nodes in the interconnect fabrics. Healthy network adapters and switches may show erratic behavior in the presence of unhealthy node in the fabric, to the point that entire fabric becomes frozen until a non-healthy component is physically removed from the fabric. In certain cases, the failure may continue after the removal of unhealthy component and may require reboot or reset of components in the fabric (switches and nodes) leading to increased down time.

Thus, a timely detection of non-responding nodes becomes a critical task that can prevent catastrophic impact of interrupting operations.

BRIEF SUMMARY

A computer-implemented method according to one aspect includes determining whether an operating system of a node of a distributed computing environment is functioning correctly by sending a first management query to the node; in response to determining that the operating system of the node is not functioning correctly, determining whether the node has an active communication link by sending a second management query to ports associated with the node; and in response to determining that the node has an active communication link, resetting the active communication link for the node by sending a reset request to the ports associated with the node.

In this way, problematic nodes having faulty operating system functionality or faulty network adapters as well as active links may be fenced (e.g., identified and removed from the distributed computing environment). This may eliminate any communications backlogs caused by these problematic nodes within the distributed computing environment, and may therefore improve a functioning of all nodes within the distributed computing environment.

In one aspect, the first management query and the second management query are both high-priority queries. In this way, data communication issues within the distributed computing environment may be minimized by prioritizing the distributed monitoring of nodes within the environment.

According to another aspect, a computer program product for fencing non-responding ports in a network fabric includes a computer readable storage medium having program instructions embodied therewith, where the computer readable storage medium is not a transitory signal per se, and where the program instructions are executable by a processor to cause the processor to perform a method including determining whether an operating system of a node of a distributed computing environment is functioning correctly by sending a first management query to the node, utilizing the processor; in response to determining that the operating system of the node is not functioning correctly, determining whether the node has an active communication link by sending a second management query to ports associated with the node, utilizing the processor; and in response to determining that the node has an active communication link, resetting the active communication link for the node by sending a reset request to the ports associated with the node, utilizing the processor.

In one aspect, a monitoring node within the distributed computing environment is only allowed to send a predetermined number of reset requests to another node within a predetermined time period.

In this way, a faulty monitoring node may be prevented from disrupting another functioning node with unwarranted reset requests.

According to another aspect, a system includes a processor; and logic integrated with the processor, executable by the processor, or integrated with and executable by the processor, where the logic is configured to determine whether an operating system of a node of a distributed computing environment is functioning correctly by sending a first management query to the node; in response to determining that the operating system of the node is not functioning correctly, determine whether the node has an active communication link by sending a second management query to ports associated with the node; and in response to determining that the node has an active communication link, reset the active communication link for the node by sending a reset request to the ports associated with the node.

According to another aspect, a computer-implemented method includes sending a first management query from a first node of a distributed computing environment to a second node of the distributed computing environment, where the first management query is associated with an operating system of the second node; in response to a failure to receive, at the first node, a response to the first management query from the second node, sending, from the first node to one or more communication ports associated with the second node, a second management query; and in response to receiving, at the first node, a response to the second management query from the one or more communication ports associated with the second node indicating that the second node has an active communication link, sending, by the first node to the one or more communication ports associated with the second node, a link reset request to reset the one or more communication ports of the second node with the active communication link.

In this way, the first node may act as a managing node, and may trigger the removal of the second node from the distributed computing environment in response to determining a specific scenario where the second node has an operating system issue or a network adapter issue and also has an active communication link. This may eliminate network congestion within the distributed computing environment caused by the second node, and may thereby improve a performance of the first node and all other computing nodes within the distributed computing environment.

According to another aspect, a computer program product for implementing a management node within a distributed computing environment includes a computer readable storage medium having program instructions embodied therewith, where the computer readable storage medium is not a transitory signal per se, and where the program instructions are executable by a processor to cause the processor to perform a method comprising sending a first management query from a first node of a distributed computing environment to a second node of the distributed computing environment, utilizing the processor, where the first management query is associated with an operating system of the second node; in response to a failure to receive, at the first node, a response to the first management query from the second node, sending, from the first node to one or more communication ports associated with the second node, a second management query, utilizing the processor; and in response to receiving, at the first node, a response to the second management query from the one or more communication ports associated with the second node indicating that the second node has an active communication link, sending, by the first node to the one or more communication ports associated with the second node, a link reset request to reset the one or more communication ports of the second node with the active communication link, utilizing the processor.

Other aspects and embodiments of the present invention will become apparent from the following detailed description, which, when taken in conjunction with the drawings, illustrate by way of example the principles of the invention.

DETAILED DESCRIPTION

Figure 1:
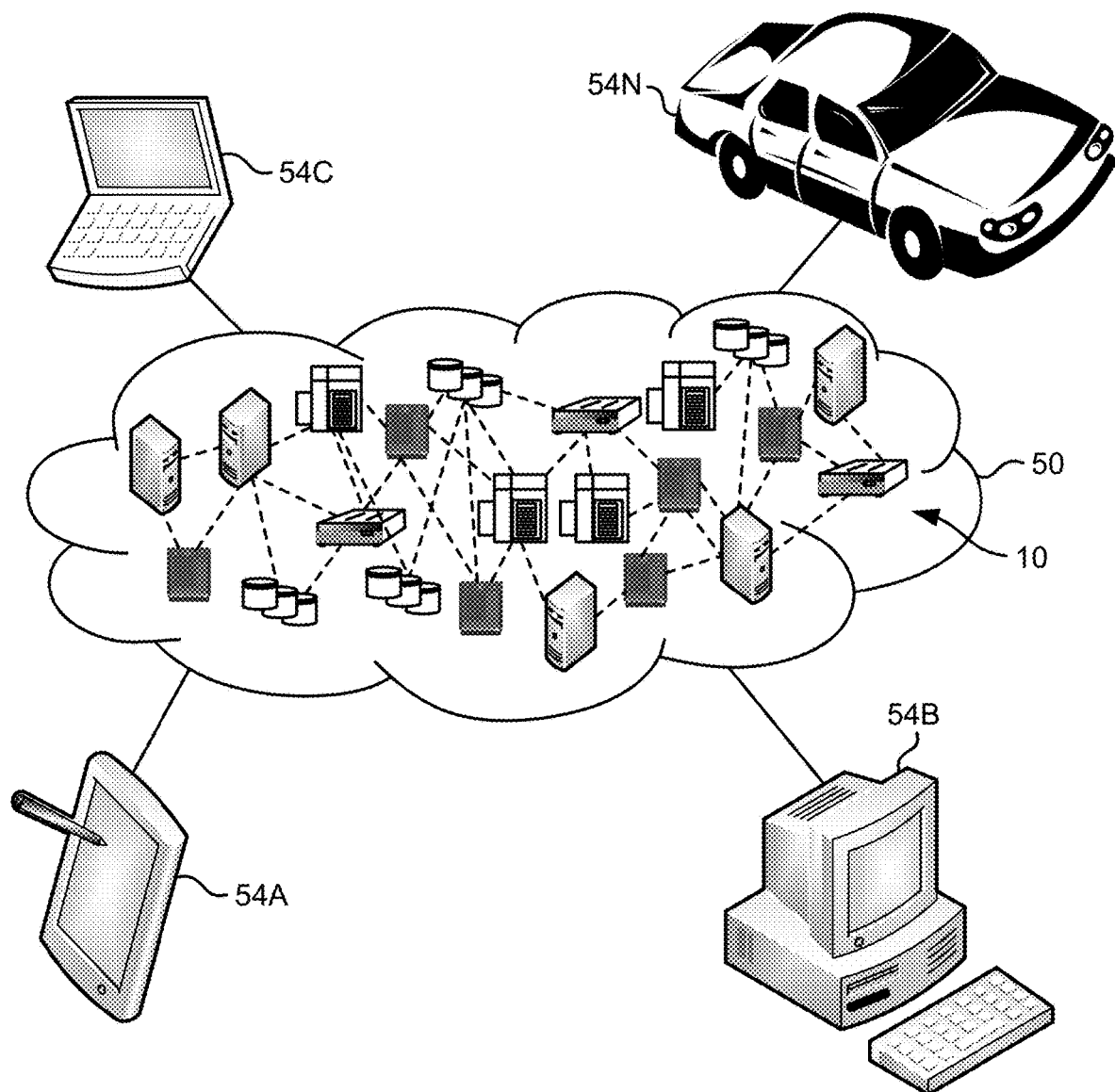
FIG. 1 depicts a cloud computing environment in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several aspects of fencing non-responding ports in a network fabric.

In one general aspect, a computer-implemented method includes determining whether an operating system of a node of a distributed computing environment is functioning correctly by sending a first management query to the node; in response to determining that the operating system of the node is not functioning correctly, determining whether the node has an active communication link by sending a second management query to ports associated with the node; and in response to determining that the node has an active communication link, resetting the active communication link for the node by sending a reset request to the ports associated with the node.

In this way, problematic nodes having faulty operating system functionality or faulty network adapters as well as active links may be fenced (e.g., identified and removed from the distributed computing environment). This may eliminate any communications backlogs caused by these problematic nodes within the distributed computing environment, and may therefore improve a functioning of all nodes within the distributed computing environment.

In one aspect, the first management query and the second management query are both high-priority queries. In this way, data communication issues within the distributed computing environment may be minimized by prioritizing the distributed monitoring of nodes within the environment.

In another general aspect, a computer program product for fencing non-responding ports in a network fabric includes a computer readable storage medium having program instructions embodied therewith, where the computer readable storage medium is not a transitory signal per se, and where the program instructions are executable by a processor to cause the processor to perform a method including determining whether an operating system of a node of a distributed computing environment is functioning correctly by sending a first management query to the node, utilizing the processor; in response to determining that the operating system of the node is not functioning correctly, determining whether the node has an active communication link by sending a second management query to ports associated with the node, utilizing the processor; and in response to determining that the node has an active communication link, resetting the active communication link for the node by sending a reset request to the ports associated with the node, utilizing the processor.

In one aspect, a monitoring node within the distributed computing environment is only allowed to send a predetermined number of reset requests to another node within a predetermined time period.

In this way, a faulty monitoring node may be prevented from disrupting another functioning node with unwarranted reset requests.

In another general aspect, a system includes a processor; and logic integrated with the processor, executable by the processor, or integrated with and executable by the processor, where the logic is configured to determine whether an operating system of a node of a distributed computing environment is functioning correctly by sending a first management query to the node; in response to determining that the operating system of the node is not functioning correctly, determine whether the node has an active communication link by sending a second management query to ports associated with the node; and in response to determining that the node has an active communication link, reset the active communication link for the node by sending a reset request to the ports associated with the node.

In another general aspect, a computer-implemented method includes sending a first management query from a first node of a distributed computing environment to a second node of the distributed computing environment, where the first management query is associated with an operating system of the second node; in response to a failure to receive, at the first node, a response to the first management query from the second node, sending, from the first node to one or more communication ports associated with the second node, a second management query; and in response to receiving, at the first node, a response to the second management query from the one or more communication ports associated with the second node indicating that the second node has an active communication link, sending, by the first node to the one or more communication ports associated with the second node, a link reset request to reset the one or more communication ports of the second node with the active communication link.

In this way, the first node may act as a managing node, and may trigger the removal of the second node from the distributed computing environment in response to determining a specific scenario where the second node has an operating system issue or a network adapter issue and also has an active communication link. This may eliminate network congestion within the distributed computing environment caused by the second node, and may thereby improve a performance of the first node and all other computing nodes within the distributed computing environment.

In another general aspect, a computer program product for implementing a management node within a distributed computing environment includes a computer readable storage medium having program instructions embodied therewith, where the computer readable storage medium is not a transitory signal per se, and where the program instructions are executable by a processor to cause the processor to perform a method comprising sending a first management query from a first node of a distributed computing environment to a second node of the distributed computing environment, utilizing the processor, where the first management query is associated with an operating system of the second node; in response to a failure to receive, at the first node, a response to the first management query from the second node, sending, from the first node to one or more communication ports associated with the second node, a second management query, utilizing the processor; and in response to receiving, at the first node, a response to the second management query from the one or more communication ports associated with the second node indicating that the second node has an active communication link, sending, by the first node to the one or more communication ports associated with the second node, a link reset request to reset the one or more communication ports of the second node with the active communication link, utilizing the processor.

It is to be understood that although this disclosure includes a detailed description on cloud computing, implementation of the teachings recited herein are not limited to a cloud computing environment. Rather, aspects of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
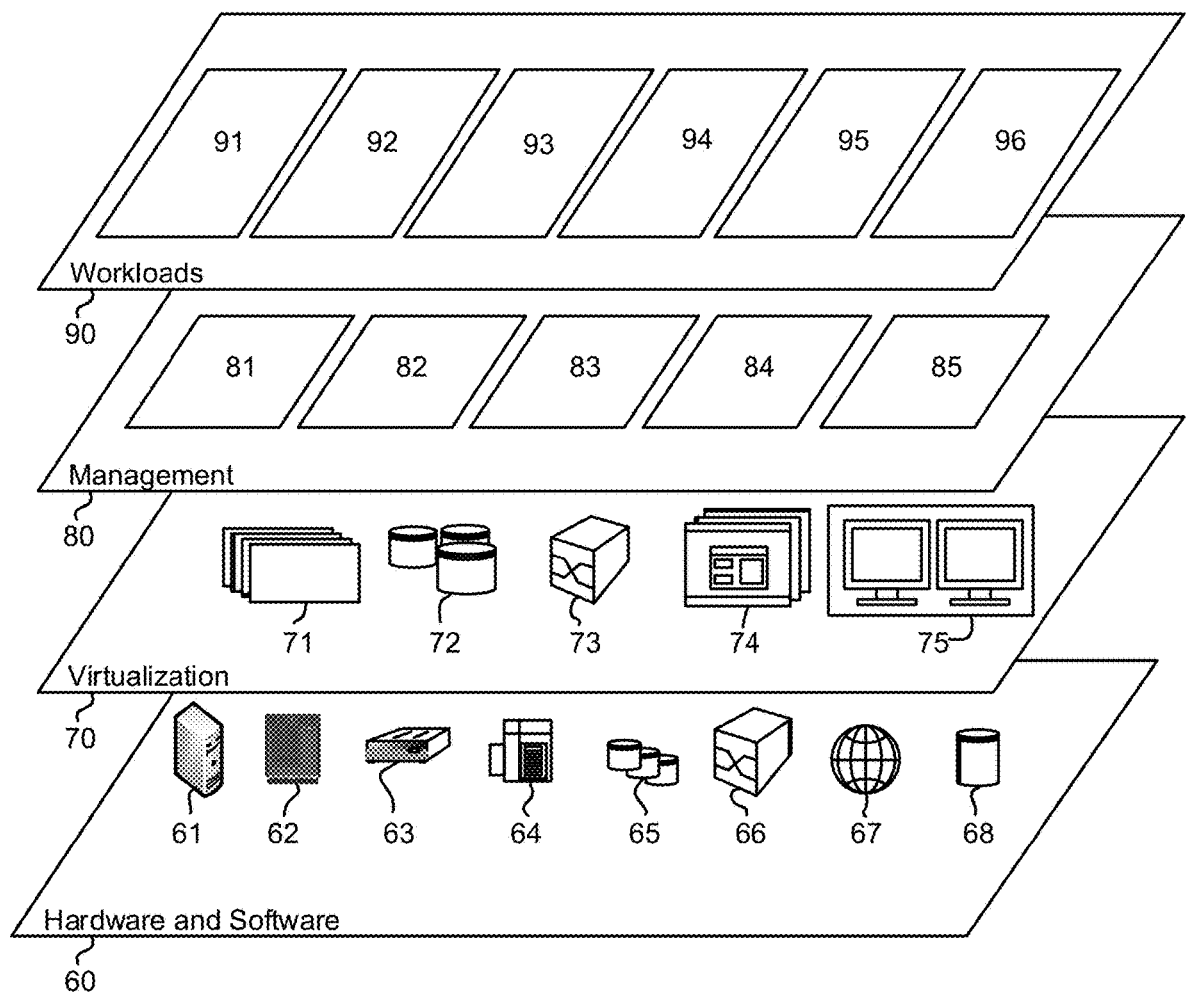
FIG. 2 depicts abstraction model layers in accordance with one aspect of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and aspects of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed computing 96.

Figure 3:
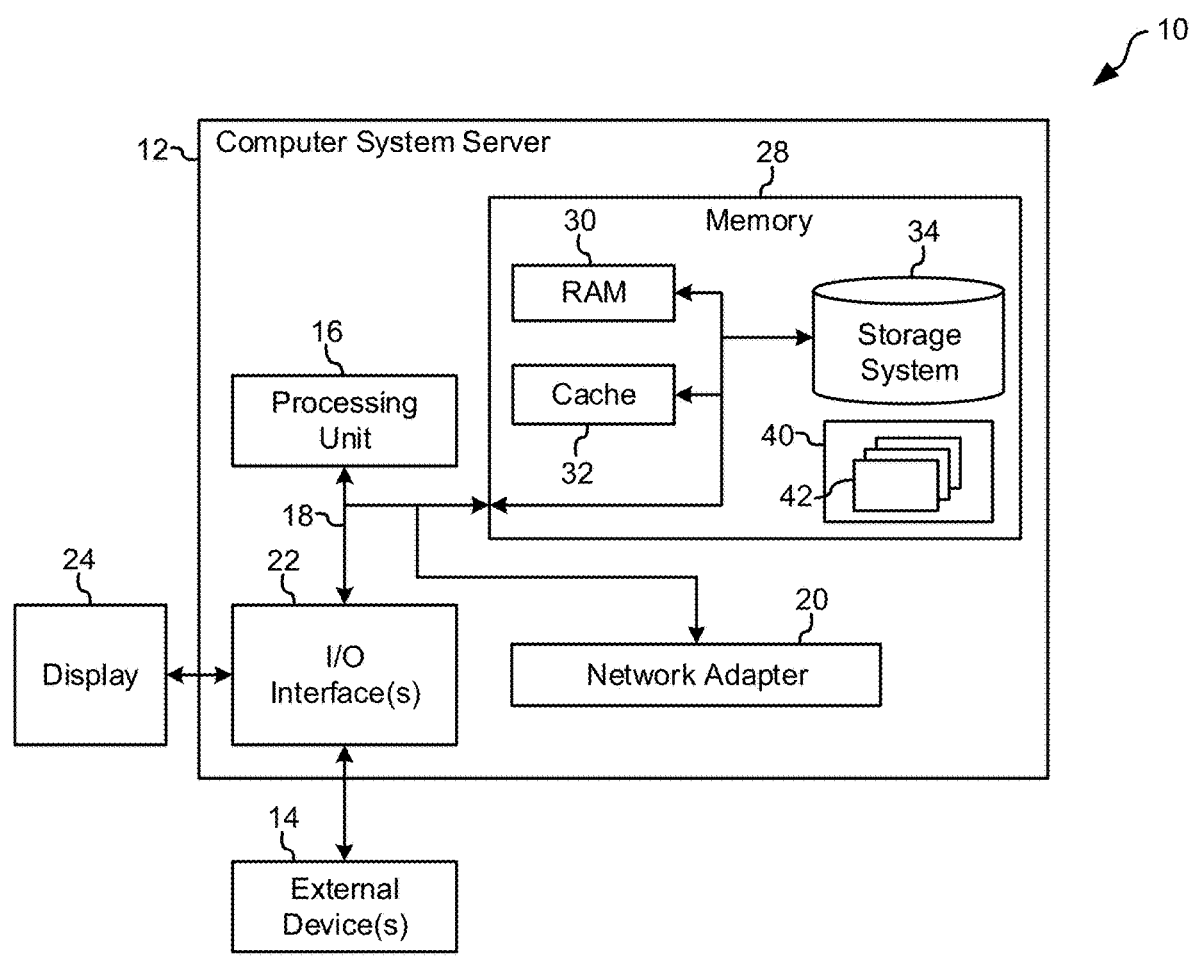
FIG. 3 depicts a cloud computing node in accordance with one aspect of the present invention.

Referring now to FIG. 3, a schematic of an example of a cloud computing node is shown. Cloud computing node 10 is only one example of a suitable cloud computing node and is not intended to suggest any limitation as to the scope of use or functionality of aspects of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of aspects of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of aspects of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
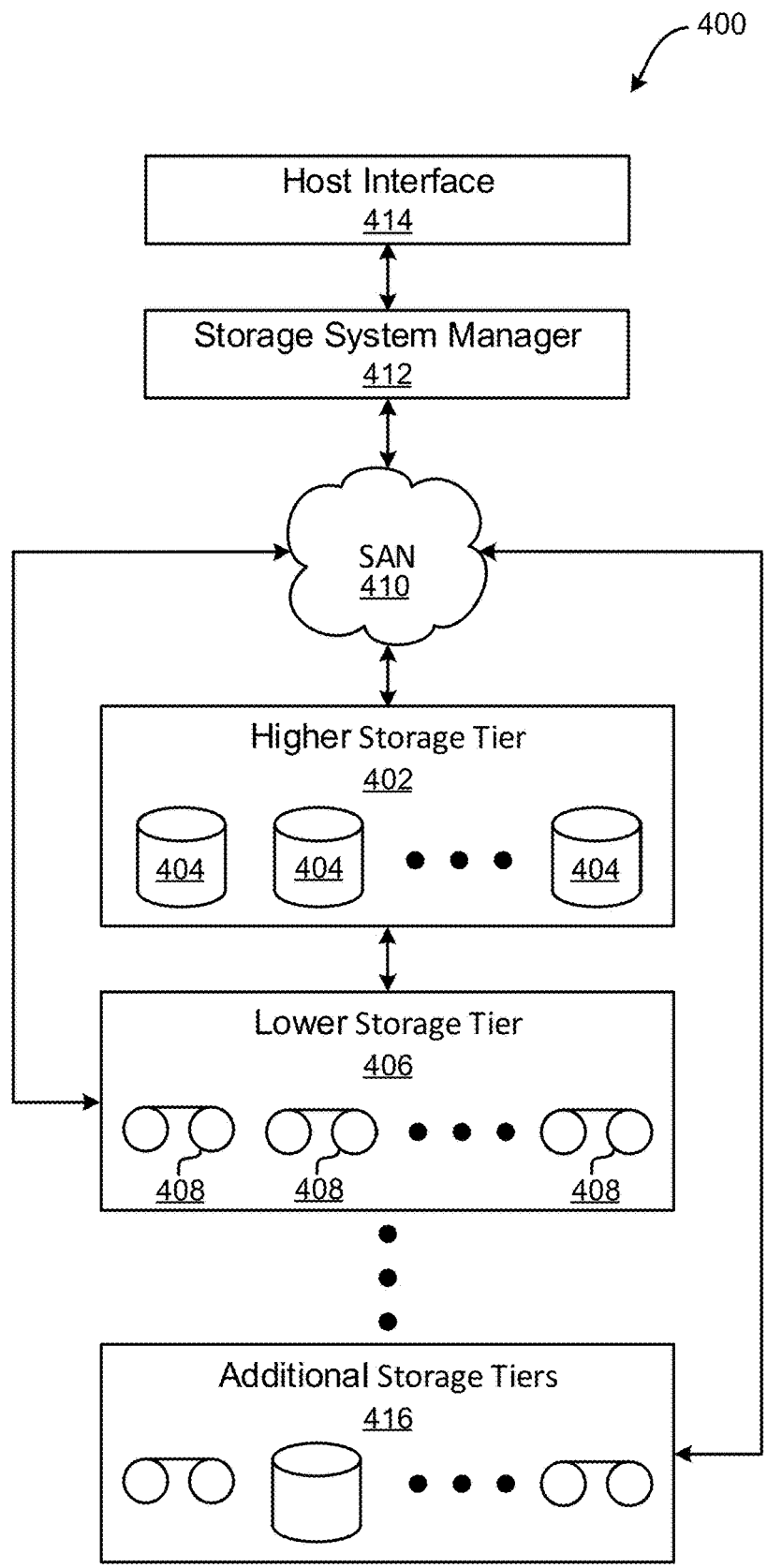
FIG. 4 illustrates a tiered data storage system in accordance with one aspect of the present invention.

Now referring to FIG. 4, a storage system 400 is shown according to one aspect. Note that some of the elements shown in FIG. 4 may be implemented as hardware and/or software, according to various aspects. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the aspects presented herein.

According to some aspects, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various aspects.

Figure 5:
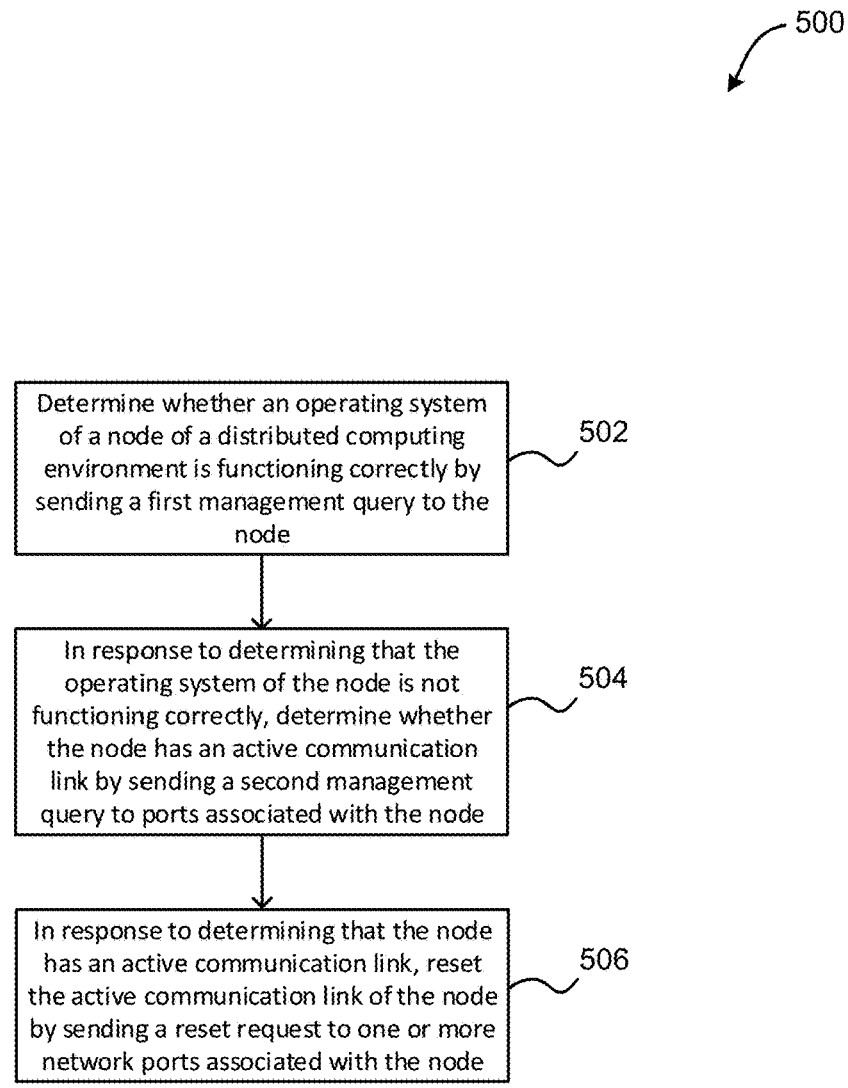
FIG. 5 illustrates a flowchart of a method for fencing non-responding ports in a network fabric, in accordance with one aspect of the present invention.

Now referring to FIG. 5, a flowchart of a method 500 is shown according to one aspect. The method 500 may be performed in accordance with the present invention in any of the environments depicted in FIGS. 1-4 and 7, among others, in various aspects. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where it is determined whether an operating system of a node of a distributed computing environment is functioning correctly by sending a first management query to the node. In one aspect, the distributed computing environment may include a plurality of nodes (e.g., computation nodes, etc.) working together to perform one or more computation actions (e.g., running applications, processing data, etc.). For example, the node may include a computing device (e.g., a computer, a server, etc.) with physical, tangible hardware storage and computing resources.

In one aspect, it may be determined whether a network adapter of the node is functioning correctly. For example, the first management query may also determine whether the node's network adapter is reachable, available, operational, etc. In another aspect, the first management query may check whether the operating system of the node is reachable (e.g., whether the OS can function using its port).

Additionally, in one aspect, the distributed computing environment may implement a variety of applications (e.g., stock market applications, storage services, database services, etc.). In another aspect, the nodes within the distributed computing environment may all be located within the same physical location, and may be connected utilizing point-to-point connections.

Further, in one aspect, the nodes within the distributed computing environment may be located in different physical locations, and may be connected utilizing fast-speed connections (e.g., fiber channel connections, etc.). In another aspect, all nodes within the distributed computing environment may communicate with each other with a low latency via one or more high data rate connections (e.g., fast Ethernet connections, InfiniBand (TB) connections, hardware-level connections, etc.). In still another aspect, nodes within the distributed computing environment may share resources (e.g., processing capability, memory, etc.) with each other within the distributed computing environment.

Further still, in one aspect, the distributed computing environment may include a grid architecture, a network fabric, etc. In another aspect, a first node of the distributed computing environment may send the first management query directly to the second node (e.g., via a point-to-point connection between the two nodes). In yet another aspect, a first node of the distributed computing environment may indirectly send the first management query to the second node (e.g., via a switch located between the two nodes, etc.).

Also, in one aspect, the first node and the second node may be neighbor nodes within the distributed computing environment. In another aspect, the first node may send the first management query to the second node in response to determining that the second node is a neighbor node to the first node. In yet another aspect, a daemon (e.g., an application or code such as a monitoring agent, etc.) running on the first node may send the first management query from the first node to the second node.

In addition, in one aspect, the first management query may include a fabric management query that terminates within the operating system of the receiving node. For example, in Infiniband fabric, the first management query may include an SMP (Subnet Management Protocol) MAD (Management Datagram) query of attribute type SMINFO (Subnet Manager Information) that is terminated by the operating system. In another aspect, in response to receiving the first management query, an operating system of the receiving node may send a response to the first management query. For example, the response may only be sent if the operating system of the receiving node is operating correctly. In another example, the response may not be sent if the operating system of the receiving node is not operating correctly, is non-functional, etc.

Furthermore, method 500 may proceed with operation 504, where in response to determining that the operating system of the node is not functioning correctly, determining whether the node has an active communication link by sending a second management query to ports associated with the node. In one aspect, it may be determined that the operating system of the node is not functioning correctly in response to determining that a response to the first management query has not been received from the node within a predetermined time period.

For example, the first management query may be re-sent to the node one or more times in response to determining that the response to the first management query has not been received from the node within the predetermined time period. In another example, it may be determined that the node is not functioning correctly in response to determining that no response has been received from the node after re-sending the first management query to the node a predetermined number of times.

Further still, in one aspect, it may be determined that the operating system of the second node is functioning correctly in response to determining that a response to the first management query has been received from the node within a predetermined time period. For example, in response to determining that the operating system of the node is functioning correctly, the first management query may be sent again to the node at a later time according to a predetermined monitoring schedule.

Also, in one aspect, the response may be received at the node that sent the first management query. For example, if a first node of the distributed computing environment sent the first management query to the second node, the response from the second node may be received at the first node. In another aspect, in response to determining that a response to the first management query has not been received from the node within a predetermined time period, the second management query may be sent to ports associated with the node.

Additionally, the second management query may check whether the node has an active communication link by asking a relevant network port whether its link is active. In one aspect, an active communication link may include an active connection between a port on the node and another port on another node. In this case, the first node of the distributed computing environment may send the second management query directly to its local port connected to the second node. In another aspect, an active communication link may include an active connection between a port on the node and another port on the switch. In this case, the first node of the distributed computing environment may send the second management query to the switch, querying the state of the port of the second node. In still another aspect, the first node of the distributed computing environment may indirectly or directly send the second management query to the port in the second node (e.g., via a switch located between the two nodes or using a direct link). For example, in response to determining that the operating system (OS) of a second node is not functioning correctly, a first node may probe all ports associated with the second node to determine whether any ports of the second node are present and active.

Further, in one aspect, if any ports associated with the second node are present and active, the second node may be determined to have an active communication link. In another aspect, the queried network ports may respond to the second management query by indicating any active links held by the node (e.g., via one or more ports of the node, etc.). In yet another aspect, the response may be received at the node that sent the second management query. For example, if a first node of the distributed computing environment sent the second management query to ports associated with the second node, the response from the queried network ports may be received at the first node.

Further still, method 500 may proceed with operation 506, where in response to determining that the node has an active communication link, the active communication link of the node is reset by sending a reset request to one or more network ports associated with the node. In one aspect, the ports associated with the node may include one or more ports connected to the node. For example, it may be determined that the node has an active communication link in response to identifying an active port within the node in response to the second management query. In another aspect, it may be determined that the node does not have an active communication link in response to a failure to identify any active ports within the node in response to the second management query. For example, in response to determining that the node does not have an active communication link, the first management query may be sent again to the node at a later time according to a predetermined monitoring schedule.

Also, in one aspect, in response to determining that the operating system of the node is not functioning correctly, and the node also has an active communication link, the node may be immediately flagged as problematic. For example, the node may be flagged as problematic by changing metadata identifying the node within another node that is performing the monitoring (e.g., by sending the management queries, etc.).

In addition, in one aspect, in response to determining that the operating system of the node is not functioning correctly, and the node also has an active communication link, a predetermined count may be incremented, and monitoring of the node may be enhanced before flagging the node as problematic. For example, the first management query may be repeatedly sent to the node as part of a scheduled recurring monitoring activity with a first predetermined frequency.

Additionally, in one example, in response to determining that the predetermined count has been incremented, the first predetermined frequency of the scheduled recurring monitoring activity may be changed to a second predetermined frequency that is greater than the first predetermined frequency. In another example, the first management query may then be re-sent to the node according to the second predetermined frequency. In this way, once the predetermined count is initially incremented (indicating that the operating system of the node is not functioning correctly, and the node also has an active communication link), follow-up management queries may be sent to the node with an increased frequency in order to rapidly confirm that the node is problematic.

Furthermore, in one example, each time it is determined that the operating system of the node is not functioning correctly, and the node also has an active communication link, the predetermined count may be incremented. In another example, when the predetermined count exceeds a threshold, the node may then be flagged as problematic. In yet another example, the predetermined count may be reset upon determining that the node is not problematic (e.g., determining that the operating system of the node is functioning correctly, or the node has no active communication links). In this way, false positive identifications of problematic nodes may be minimized.

Further still, in one aspect, in response to flagging the node as problematic, the reset request may be sent to one more network ports associated with the node to reset the active communication links of the node. In another aspect, the reset request may be sent to the node ports to reset all active links within the node. In either case, this may result in the node having no active links, since live operating system and responding network ports are required to rejoin the fabric, and either one or the other are not functioning.

In another example, in the case of a false positive, the reset request may not remove the node from the distributed computing environment for a significant time (e.g., the link reset may result in an active node), since the node will rejoin the network after link reset action completes, because the operating system and network ports of the node are functioning.

Also, in one aspect, the entity sending the reset request may log a time and date of the reset request (e.g., using a timestamp, etc.).

Additionally, in one aspect, one or more managers within the distributed computing environment may then identify the lack of active links within the node, and may remove the node from the distributed computing environment. For example, the one or more managers may include a grid manager, a fabric manager, etc. In another example, the node may then be reset (e.g., by the one or more managers), and may later rejoin the distributed computing environment when its network ports and operating system are functioning. The use of the link reset action (as opposed to link shutdown leading to full physical isolation of the node from the network ports associated with it) allows the minimizing of both the impact of false positive detection and the need of manual intervention to resume I/O operations, since the functional nodes may be allowed to rejoin the fabric automatically.

Further, in one aspect, each node within the distributed computing environment may be designated a monitoring node. For example, each monitoring node may send the first management query, and the second management query (if needed) to all neighboring nodes, using the methods described herein. In another example, if any neighboring nodes are identified as problematic, the monitoring node may reset all active links within the problematic node. In yet another example, the problematic node may then be removed from the distributed computing environment by one or more managers, and may be reset.

In this way, monitoring within the distributed computing environment may be distributed amongst all nodes within the environment. This may reduce an impact of one or more node failures within the environment.

Further still, in one aspect, a monitoring node within the distributed computing environment may only be allowed to send a predetermined number of reset requests to another node within a predetermined time period. In another aspect, when a number of reset requests sent by the monitoring node meets a predetermined threshold, the monitoring node may continue to perform monitoring actions, but may not be able to send out additional reset requests (e.g., until a predetermined amount of time has passed, etc.). In this way, a faulty monitoring node may be prevented from disrupting another functioning node with unwarranted reset requests.

Also, in one aspect, the first management query and the second management query may both be high-priority in-band management queries or may use high SL (service level) or high VL (virtual lane) levels. In this way, data communication issues within the distributed computing environment may be minimized by prioritizing the distributed monitoring of nodes within the environment.

In yet another aspect, the first and second management queries may use a directly routed packet format (where the routing hops between the sending and the receiving ports are recorded in the packet). In this way, data communication issues within the distributed computing environment that affect its ability to route traffic may be minimized.

As a result of the above distributed monitoring, problematic nodes having faulty operating system functionality or faulty network adapters as well as active links may be fenced (e.g., identified and removed from the distributed computing environment). This may eliminate any communications backlogs caused by these problematic nodes within the distributed computing environment, and may therefore improve a functioning of all nodes within the distributed computing environment.

Figure 6:
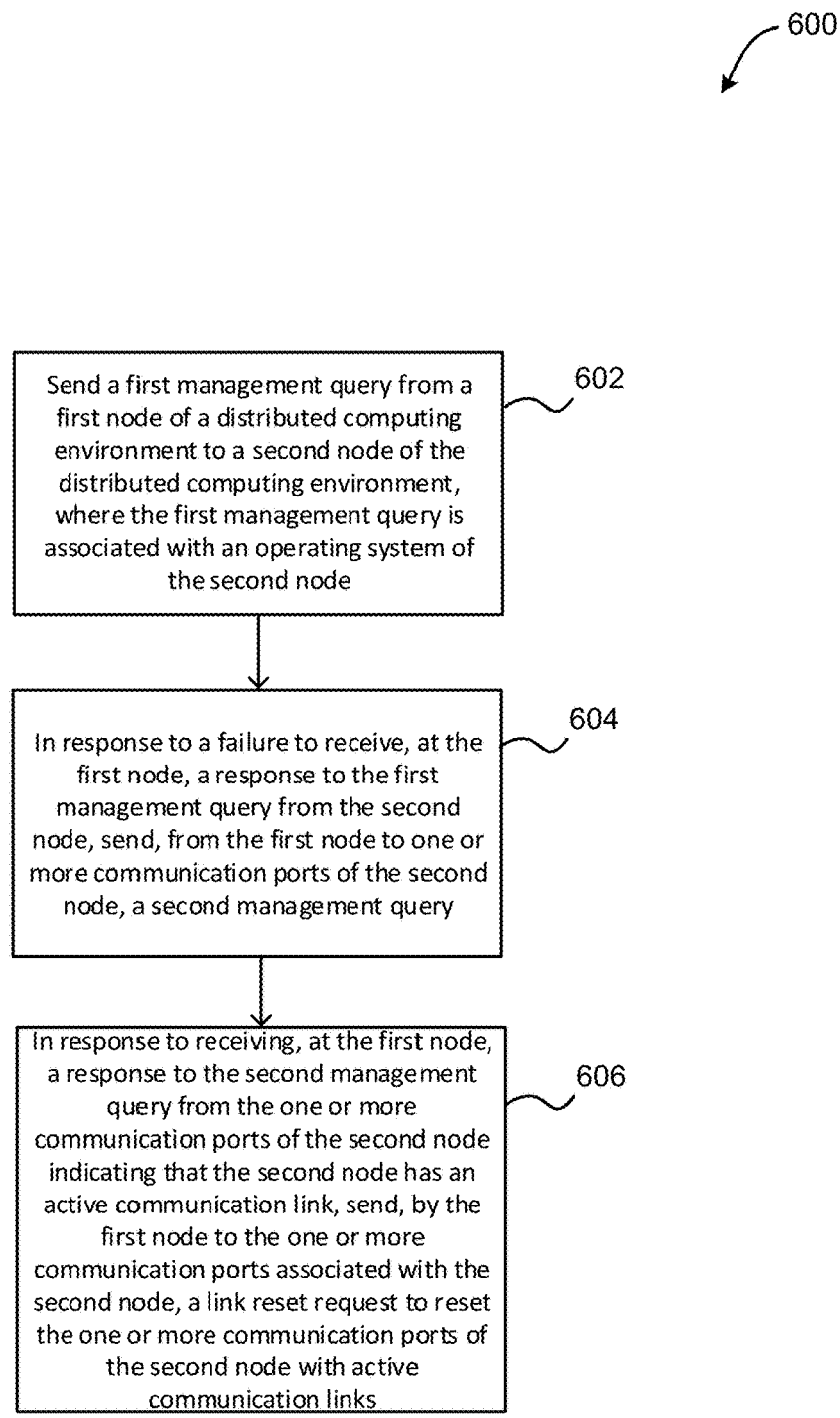
FIG. 6 illustrates a flowchart of a method for implementing a management node within a distributed computing environment, in accordance with one aspect of the present invention.

Now referring to FIG. 6, a flowchart of a method 600 for implementing a management node within a distributed computing environment is shown according to one aspect. The method 600 may be performed in accordance with the present invention in any of the environments depicted in FIGS. 1-4 and 7, among others, in various aspects. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a first management query is sent from a first node of a distributed computing environment to a second node of the distributed computing environment, where the first management query is associated with an operating system of the second node. Additionally, method 600 may proceed with operation 604, where in response to a failure to receive, at the first node, a response to the first management query from the second node, a second management query is sent from the first node to one or more communication ports associated with the second node.

Further, method 600 may proceed with operation 606, where in response to receiving, at the first node, a response to the second management query from the one or more communication ports associated with the second node indicating that the second node has an active communication link, the first node sends to one or more communication ports associated with the second node a link reset request to reset one or more communication ports of the second node with active communication links.

In this way, the first node may act as a managing node, and may trigger the removal of the second node from the distributed computing environment in response to determining a specific scenario where the second node has an operating system issue or a network adapter issue and also has an active communication link. This may eliminate network congestion within the distributed computing environment caused by the second node, and may thereby improve a performance of the first node and all other computing nodes within the distributed computing environment.

In one aspect, a plurality of additional nodes may be included with the first node and the second node within the distributed computing environment. In another aspect, each of the nodes within the distributed computing environment may monitor neighboring nodes utilizing the first management query and the second management query.

Figure 7:
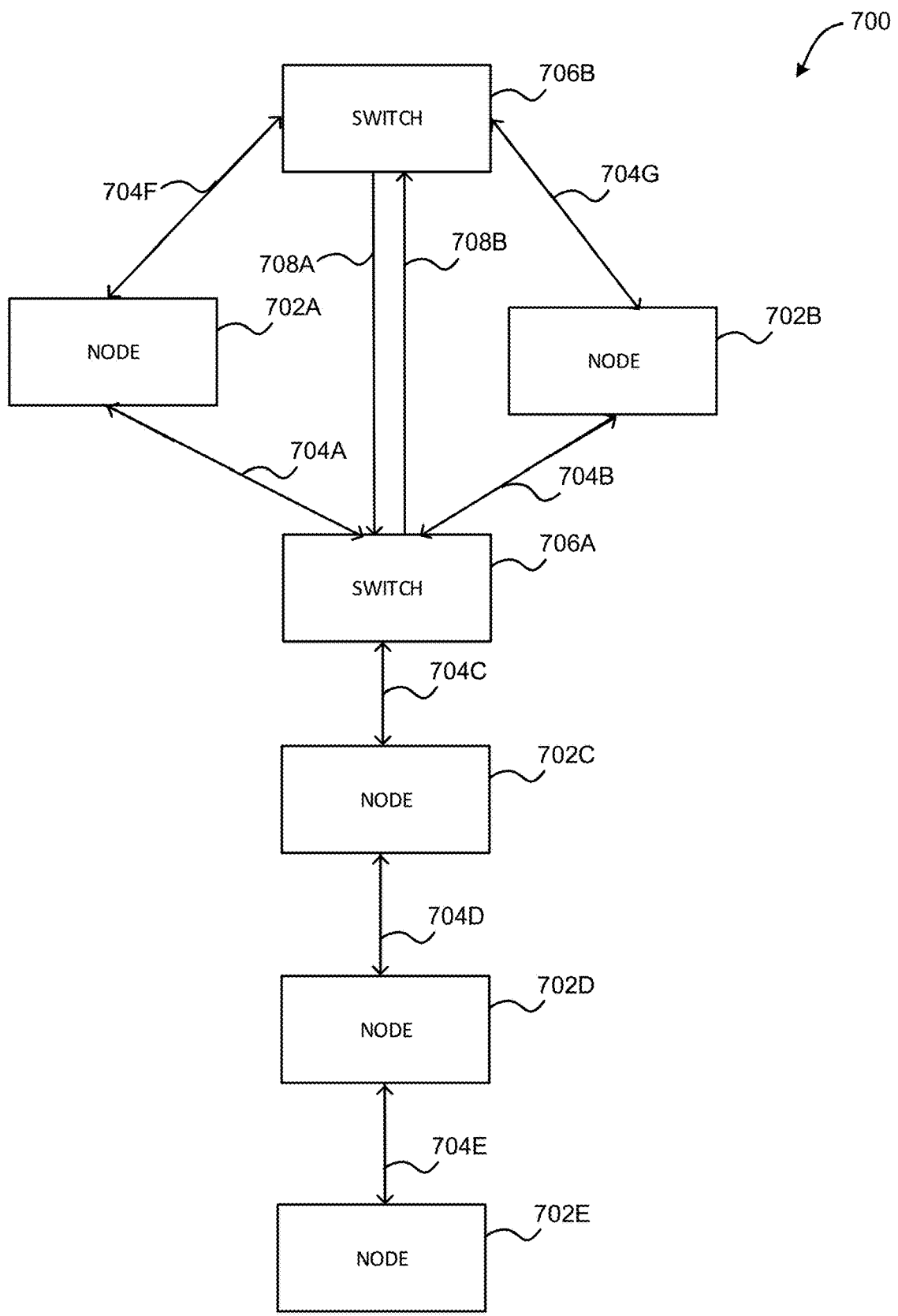
FIG. 7 illustrates an exemplary distributed computing network, in accordance with one aspect of the present invention.

FIG. 7 illustrates an exemplary distributed computing network 700, as shown in one exemplary aspect. As shown, the distributed computing network 700 includes a plurality of nodes 702A-E. In one aspect, a greater or fewer number of nodes than the plurality of nodes 702A-E may be included within the network 700.

Additionally, in one aspect, the plurality of nodes 702A-E are interconnected via network connections 704A-G, 708A-B. In one aspect, the network connections 704A-G, 708 A-B may include high-speed, low-latency data connections (e.g., fast Ethernet connections, InfiniBand connections, hardware-level connections, etc.).

Further, a plurality of communications switches 706A-B enables communications between a first portion of nodes 702A and 702B and a second node 702C. For example, the communications switches 706A-B may relay data between the first portion of nodes 702A and 702B and the second node 702C. Also, the communications switches 706A-B communicate via cross-switch network connections 708A-B to facilitate communications/monitoring between the first portion of nodes 702A and 702B and the second node 702C.

Further still, in one aspect, each of the plurality of nodes 702A-E may act as a monitoring node within the distributed computing network 700, and may communicate with its neighbor nodes to determine a status of such nodes. For example, a monitoring node 702C may communicate with its first neighbor node 702D directly to determine a status of its neighbor node 702D. Additionally, the monitoring node 702C may communicate with additional neighbor nodes 702A and 702B via the communications switches 706A-B to determine their status.

For instance, the monitoring node 702C may send a first management query directly to its neighbor node 702D, where the first management query is associated with an operating system of the receiving node. After failing to receive a response to the first management query from its neighbor node 702D, the monitoring node 702C may send a second management query to the ports associated with the neighbor node 702D.

Also, in response to receiving a response at the monitoring node 702C from the ports associated with neighbor node 702D indicating that the neighbor node 702D has an active communication link, the monitoring node 702C may send a link reset request to the port associated with the second node to reset a port of the neighbor node 702D with the active communication link. In response to receiving the link reset request from the monitoring node 702C, the ports, associated with neighbor node 702D may reset all active links within the neighbor node 702D. A grid manager or fabric manager of the distributed computing network 700 may then remove the neighbor node 702D from the distributed computing network 700.

The monitoring node 702A may also send the first management query indirectly to its additional neighbor nodes 702B and 702C via the communications switches 706A-B. In response to receiving responses to the first management query by its additional neighboring nodes 702B and 702C via either of the communications switches 706A-B, the monitoring node 702A may take no further action until its monitoring schedule indicates that another first management query is to be sent again to its additional neighbor nodes 702B and 702C. For example, the monitoring node 702A may query a neighbor node 702B using a first management query over the network connections 704A-B. Upon receiving a response to the first management query, no further action may be taken by the monitoring node 702A until the monitoring schedule resumes the monitoring for the monitoring node 702A.

Upon identifying a failure to receive a response to the first management query, the second management query may be sent using the network connection 704A to determine whether the network link 704B is active. Furthermore, the first management query is repeated by the monitoring node 702A using the network connections 704F-G, and if no response is received, the second management query is repeated over the network connection 704F to determine whether the link 704G is active. The node 702B will be flagged as problematic if both probes using the first management query (over network connections 704A-B and 704F-G) have failed and at least a one of the network connections (704B or 704G) are found to be active using the second management query. Once the node 702B is detected as problematic, network connections 704A and 704F can be used to send reset quests to reset the network connections 704B and 704G.

In this way, each of the plurality of nodes 702A-E may act as a monitoring node within the distributed computing network 700, and may trigger the removal of any problematic nodes within the distributed computing network 700, thereby improving a performance of the remaining nodes within the distributed computing network 700.

Figure 8:
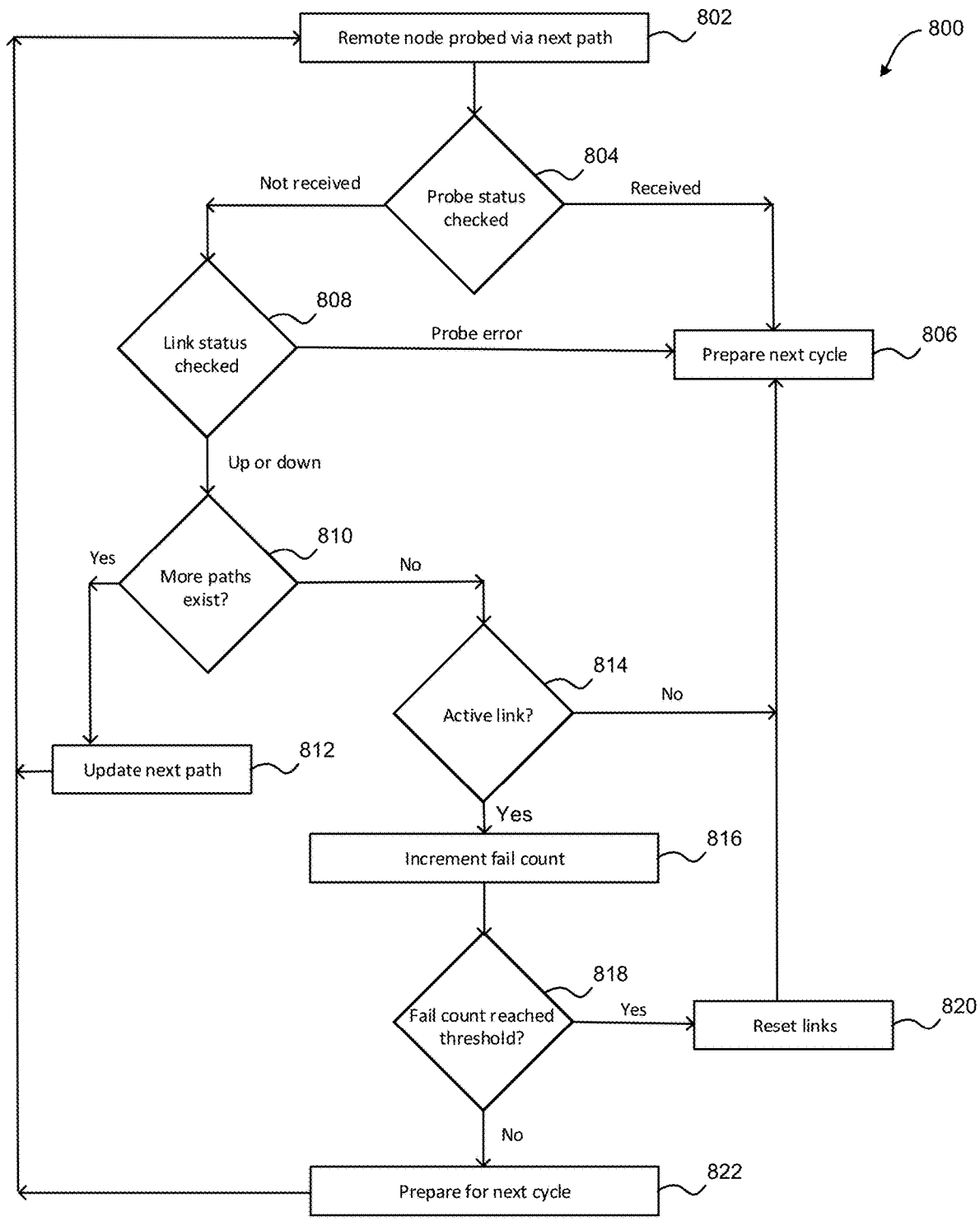
FIG. 8 illustrates a flowchart of a method for performing node monitoring within a distributed computing environment, in accordance with one aspect of the present invention.

Now referring to FIG. 8, a flowchart of a method 800 for performing node monitoring within a distributed computing environment is shown according to one aspect. The method 800 may be performed in accordance with the present invention in any of the environments depicted in FIGS. 1-4 and 7, among others, in various aspects. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various aspects, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a remote node is probed via a next path. In one aspect, the remote node may include a neighbor node of a monitoring node. Additionally, method 800 may proceed with decision 804, where a probe status is checked. If it is determined in decision 804 that a response to the probe has been received by the monitoring module, then method 800 may proceed with operation 806, where the next cycle is prepared. For example, the next path to be probed may be updated, a fail count may be set to zero, an operating system (OS) probe status may be saved for the current neighbor, and a regular delay may be used for the next probe cycle.

Additionally, if it is determined in decision 804 that a response to the probe has not been received by the monitoring module within a predetermined time period, then method 800 may proceed with decision 808, where a link status is checked for the neighbor node. If it is determined in decision 808 that a probe error exists, then method 800 may proceed with operation 806, where the next cycle is prepared. Failure to probe the status of the associated remote ports (for example, ports of a switch) may indicate that another transient (or non-transient) issue is present with the network fabric that is not handled by this method (this method handles failures of endpoint nodes). Hence, the monitoring will be resumed after a normal timeout.

Further, if it is determined in decision 808 that the link status is up or down, then method 800 may proceed with decision 810, where it is determined whether additional paths exist (e.g., to the neighbor node of the monitoring node, etc.). If it is determined in decision 810 that additional paths exist, then method 800 may proceed with operation 812, where the next path is updated, and method 800 may then proceed with operation 802, where the remote node is probed via the next path.

Further still, if it is determined in decision 810 that no additional paths exist, then method 800 may proceed with decision 814, where it is determined whether an active link is seen within the remote node. If it is determined in decision 814 that no active link is seen, then method 800 may proceed with operation 806, where the next cycle is prepared. If it is determined in decision 814 that an active link is seen, then method 800 may proceed with operation 816, where a fail count is incremented for the remote node.

Also, method 800 may proceed with decision 818, where it is determined whether the fail count for the remote node has reached a predetermined threshold. If it is determined in decision 818 that the fail count has reached the threshold, then method 800 may proceed with operation 820, where the links within the remote node are reset, and method 800 may then proceed with operation 806, where the next cycle is prepared. In one aspect, a monitoring node performing link resets may perform a limited number of link resets before the ability to perform link resets is disabled for the monitoring node.

Additionally, if it is determined in decision 818 that the fail count has not reached the threshold, then method 800 may proceed with operation 822, where preparations are made for the next cycle, and method 800 may then proceed with operation 802, where the remote node is probed via the next path. For example, preparing for the next cycle may include updating the next path, saving an OS probe status, and using a smaller delay for a next cycle.

In this way, nodes within a fabric may monitor neighboring nodes within the fabric and may trigger the removal of problematic nodes within the fabric, thereby improving a performance of the remaining nodes within the fabric.

Fencing Non-Responding Ports in an Interconnect Fabric

In one aspect, mechanisms are provided for detecting a malfunctioning node that is seen as present on a network. Modern enterprise applications often deploy a grid architecture, where a plurality of grid nodes, interconnected with a fast interconnect fabric, provide application services. Fast Ethernet, Infiniband, or Fiber Channel are exemplary interconnect solutions. Due to complex requirements of enterprise applications, various protocols are deployed on the interconnect fabric.

Classic protocols, like Ethernet or TCP/IP may not be sufficient to satisfy application requirements for performance, load balancing, and data delivery guarantees. Applications switch to interconnect protocols that allow hardware level connections and RDMA (remote direct memory access) transfers. Reliable peer-to-peer connections that are implemented at HCA (host channel adapter) level and use RDMA protocols are possible in Infiniband and DCB Ethernet (Data Center Bridging) fabrics.

Various DCB technologies are also known under the terms CEE (Converged Enhanced Ethernet) or lossless Ethernet. Grid architecture solutions support both scalability and high availability. Grids can grow by adding nodes to the fabric, and if a node fails, the entire grid cluster can reshuffle the load to remaining nodes in the grid. Once the problem with a failed node is solved, the grid can grow again to include the previously failed node.

To manage the work distribution and monitor health status of the grid, a management solution is deployed. Management solutions typically deploy a TCP protocol for communication across either the data fabric or a slower dedicated side network channel. Typically, all nodes communicate with a manager of the gird and exchange keep-alive or health messages. The manager of the grid can declare a node as failed if it reports failure or is not seen on the management network for a defined period of time. The manager can also be elected by means of TCP protocol using majority votes, when all nodes in the grid communicate with each other.

In order to discover and configure new nodes in the fabric, as well as handle their disappearance from the network in a timely manner, a fabric management solution (e.g., a subnet manager) can be deployed on the grid clusters. The fabric manager can perform periodic discovery of the fabric, nodes and ports and can handle the addition of new ports and the disappearance of existing ports.

Modern fast Interconnect solutions support speeds of 100-200 Gbits per port. At such speeds, a port that does not see a physical link problem and is capable of negotiating the correct speed without encountering errors, will quickly cause congestion in the network fabric and application flows, if it is not able to consume data at the same speed. For example, the HCA may have a problem with transferring data to the host memory, because it has hardware problems with PCI transfers, or because its DMA hardware has a malfunction.

Similar problems may occur if an entire node malfunctions and the system firmware preempts the operating system from running while handling a hardware fault. If the fault handler takes a significant time to run, the network adapter queue will become full very quickly and it will not be able to receive new packets. On the other hand, if a local or remote HCA malfunction prevents applications from sending and receiving data with required integrity and speed, applications may be prevented from completing transactions.

In particular, storage grid solutions have a need to synchronize certain transactions across the entire grid cluster (e.g., when a storage distribution changes due to a new node addition, an existing node deletion, a volume creation or deletion, taking a snapshot, etc.). When this happens, new storage transactions from clients cannot proceed until distribution is synchronized across all nodes within the grid. If a node is stuck during such transaction, the manager may need to quickly identify and fail a stuck node to enable client IOs to proceed.

A situation becomes critical when the entire fabric malfunctions due a presence of a crashed node with links in an active state. The presence of a crashed node with active links within the Interconnect fabric is not a well-tested situation. For many practical failure scenarios, Interconnect links may go down quickly when an operating system cannot execute. Many Interconnect fabrics are reliable networks that use hardware credit flow control mechanisms and have timeouts for head of queue packets and all packets within the transmit queue. The transport standards cope with a component that is present in the network but is not able to send or receive packets.

The standards are defined such that a presence of a malfunctioning component (e.g., one that is not releasing credits because it is not able to receive data) shall not block the entire fabric for a long time leading to its collapse. For example, in an Infiniband network, no packet may be stuck longer then 2-2.5 seconds in the transmit queue of the switch port. Thus, if all switch port credits are consumed by the crashed endpoint, the switch port will be able to provide transmit credits again within that time period.

However, if one piece of software is within a critical section, where it needs to communicate with a failed destination again and again until it sees an error or succeeds in order to leave the critical section, it may prevent other pieces of software (like cluster grid logic) to communicate, because all transmit port credits are consumed by a failed component repeatedly. Thus, the software is both unable to provide I/O services (because it is in a critical section) and is also unable to abort the critical section, because the communication associated with the critical section blocks other traffic that may detect the failure and communicate the failure across the grid.

Additionally, real-life tests show that existing switches and nodes do not cope well with malfunctioning ports in the fabric that have links present but cannot receive packets, despite reliable network guarantees and what transport standards say. Thus, one misbehaving port in the fabric can bring entire grid cluster down. A method is therefore needed to fail (detect and fence) a non-responding port in the fabric, in order to allow applications to proceed.

In one aspect, a method is provided to implement a distributed fabric management solution that can fence non-responding ports in an Interconnect fabric. Each node in the fabric is tasked with monitoring one or more neighbor ports in a way that monitoring redundancy is achieved. The monitoring is done using a fabric management query that has a high delivery priority and is terminated within the operating system.

Monitoring of the link presence is also done using a high priority query fabric management query to the switch (or connected endpoint in the absence of the switch), that may be terminated in switch or adapter firmware. A problem within a node is detected when the node ports have active links but none of the active links respond to the management query terminated in the operating system.

Upon reliable detection of the problem, the monitoring agent requests the switch to reset the links (or asks for a local link reset within point-to-point switchless fabrics). The fabric management solution is such that an activation of links in data mode is possible only if the node with discovered links responds at an OS level. Thus, problematic links will remain inactive for data transfer until the operating system recovers.

A distributed monitoring solution is provided. Each node monitors more than one neighbor nodes and monitoring redundancy is achieved. This solution implements a SMINFO management discovery attribute that is terminated by the operating system. High priority transmission of management query is guaranteed by the interconnect fabric. Each monitoring party does periodic discoveries of its neighbors as follows:

1. Neighbor ports are queried with a management attribute that is terminated in the OS. The probe succeeds and is completed as soon as at least one neighbor port answers.

2. If none of the ports answer, the monitoring node will probe all ports of the neighbor for a physical link presence. A switch is used for the query for switched networks, and local port queries are used for point-to-point links. Queries are aborted as soon at least one port is found having a link.

3. The node is flagged as problematic if a) none of its ports answer the SMINFO query, and at least one port of the node has a physical link.

Under normal operating conditions, higher monitoring intervals are used. Once the problem is detected, the monitoring interval is decreased. The timestamp of the problem detection is recorded and reported with the event. The recovery action takes place after a repeated detection of the problem takes place (a configurable predetermined number is used).

The recovery action will reset the node links using commands to the switch on switched fabrics and commands to local ports in point-to-point switchless fabrics. The timestamp of the recovery action is recorded and reported via events. Any successful monitoring step will reset the repeated fail detection counter to zero. The time stamp of the switch from non-zero to zero value is also recorded and reported via events.

The monitoring can be enabled and disabled per-node basis, and may also enable a bullet mechanism. When enabled, a limited number of recovery action bullets is given to each monitor. Once action bullets are spent, they will be refilled only after a defined period of time. This allows the monitor to reset the links of a monitored node no more than a defined number of times during a defined time slice. Once bullets are spent, the monitoring is not suspended, and the time of all transition events is recorded and reported without taking the link reset action.

This solution is tolerant to node failures (since it is distributed), and is also tolerant to data communication collapse (since it is using high priority fabric management traffic). The solution also avoids a false positive detection of communication loss (since it is using multiple probes), and avoids a false negative detection of a communication presence (since it is using both a links probe and an operating system probe).

At the same time, the solution is capable of detecting non-responding ports and taking a recovery action within a short time that is sufficient to avoid both application failures and fabric collapse. If a false positive detection occurs, it is not expected to have a significant impact—once the links are renegotiated, the node with reset links will join the fabric (since it responds to fabric management commands or can initiate joining the fabric) and will resume I/O operations.

InfiniBand Port Fencing for Crashed Modules

In one aspect, in an A9000 grid storage architecture, a module is a building block of the storage grid. A module is a server that has CPU, memory, peripheral device and runs XIV storage software. XIV storage software is based on Linux operating system and XIV storage services, and runs in user and kernel space.

In another aspect, a crashed node includes a module that is not capable to execute XIV OS and storage services, due to a hardware or software malfunction. In another aspect, A9000 grid storage uses Infiniband Interconnect to communicate between modules in a switched or switchless (point-to-point) topology.

In yet another aspect, port fencing may include shutting down IB ports (e.g., on a crashed module), in a way that data communication with the rest of the storage grid is not possible.

In still another aspect, an IB fabric may include a high speed Infiniband network of switches, endpoints and links which allows endpoints (IB ports on a module) to exchange data. For example, an A9000 system uses 56 Gbit IB links between modules and has 2 IB ports per module in rack configuration and 4 IB ports per module in POD configuration. In another example, rack A9000 systems have two Infiniband switches that connect modules and backend storage, while POD A9000 systems use point-to-point connections between modules and backend storage.

Additionally, in one aspect, an integrated management controller (IMM) may include a dedicated board (CPU+memory+IO devices) within an A9000 module that remains operational even on standby power. The IMM may run its own operating system and a set of software services that allow remote management and hardware diagnostics.

Further, in one aspect, assuming an UFI BIOS in communication with an IMM, UFI system firmware running on the server CPU is responsible for server booting. The firmware installs a set of exception handlers and timers that will trigger a run of UFI code when hardware events happen or timers are triggered. The UFI firmware preempts running an operating system when its handlers are run. It then can communicate with IMM and request it to execute error collection tasks, as well as tasks to reset, shut down or power cycle the server. When hardware errors (like memory errors or PCIE errors) take place, the UFI may try to collect data and make decisions to power off or power cycle the server. Depending on the failure scenarios, these tasks may take a significant time resulting in non-operational modules with IB links in active state.

Further still, In an Infiniband environment, management datagrams (MADs) are used to discover and configure the fabric and to execute remote hardware or software commands. Each MAD has a framing defined by class, method, attribute, and attribute modifier. A class defines a range of commands for specific application use—SM (Subnet Manager) and SA (Subnet Administration) classes for subnet managers, a Performance class for monitoring, a CM class for connection management, etc. A method defines a type of access (e.g., Get or Set). An attribute defines a command within the class, and the modifier defines command parameters.

Also, in one aspect, a subnet manager includes a software entity running on one of the endpoints within an Infiniband fabric. The Subnet Manager is responsible for discovering and configuring the Infiniband fabric (e.g., by performing link management and configuration, switch unicast and multicast routing tables, etc.) and providing Subnet Administration services (e.g., multicast groups management and fabric queries). The Subnet Manager uses SM MAD datagrams to implement discovery and configuration and SA MAD datagrams to implement SA services.

In another aspect, ACTIVE IB Ports include Infiniband ports that have a present IB link and are configured for data transfers using high-speed reliable protocols. These are also known as ports that have active IB links.

Table 1 includes an exemplary crash detect API, according to one exemplary aspect.

TABLE 1

```
typedef_struct_crash_detect_params_t__s {
uint16_t probe_interval_ms;
uint16_t failed_probe_interval_ms;
uint16_t link_probe_to ms;_
uint16_t os_probe_to_ms;
uint16_t_link_reset_to_ms;
uint8_t allowed_fail_cnt;
uint8_t allowed_bullets;_
uint16_t bullet_lease_sec;
} crash_detect_params_t;
struct crash_detect_ctx;_
typedef struct crash_detect_ctx_crash_detect_ctx_t;
typedef struct {
uint8_t dr_path port[6];
uint8_t dr_hop_cnt;
uint8_t rem_port;
void *mad_handle;
} port_path_t;
struct crash_detect_ctx {
crash_detect_params_t params;
```

TABLE 1-continued

```
port_path_t port_path[2];
uint8_t actual_fail_cnt;
uint8_t used_bullets;
uint64_t bullet_fire_stamp;
void_(*os_probe_state_change_cb)(crash_detect_ctx_t_*ctx, bool probe_ok);
void (*link_reset_cb)(crash_detect_ctx_t *ctx, bool reset_called);
bool os_probe_ok;
bool single_port;
uint8_t next_first_path;
};
void end_point_crash_detect_loop(crash_detect_ctx_t *ctx);
```

The call to end_point_crash_detect_loop( ) API monitors a single module (server) and the context argument defines monitoring parameters and addressing information.

The meaning of context fields is as follows:

params—monitoring parameters. The structure and the monitoring API are defined in a way, that allows changing of monitoring parameters from a thread context, that is different from the monitoring context. The meaning of the fields is the following:

probe_interval_ms—monitoring interval, in milliseconds—first or first after a good ping failed_probe_interval_ms—monitoring interval in milliseconds, after a failed ping detected link_probe_to_ms—MAD timeout for link probe command os_probe_to_ms—MAD timeout for OS ping command link_reset_to_ms—MAD timeout for link reset command allowed_fail_cnt—number consecutive failed OS ping commands before module links are reset (counted as hit only if ping fails but at least one of the links is detected as ACTIVE)

allowed_bullets—number of allowed resets per bullet_lease_sec period bullet_lease_sec—the time span that defines the number of allowed resets (allowed_bullets) during that time.

port_path—the path parameters to a monitored module. Rack systems have two paths (both ports of a destination can be probed), and POD systems have single path (single port of a destination can be monitored). The meaning of the fields in each path definition is the following:

dr_path_port—direct path to the destination port. This path can be safely modified from a thread context, different to monitoring, provided native aligned types (1, 2, 4, 8 bytes) are used to set and read the path. This is because the monitoring code copies the path to a private data structure at the beginning of each monitoring cycle, and will use a consistent path definition—either one that was before the change or one that is after the change.

dr_hop_cnt—defines the number of hops in the direct path.

rem_port—specifies the port used to query the link. This port belongs to the destination, that is one hop prior to the monitored module. On RACK systems, it is the same as last hop in the address (switch port). On POD systems, it is not known, and must be defined.

mad_handle—specifies the local MAD device that needs to be used to reach specified remote port actual_fail_cnt—the number of consecutive OS ping failed probes—varies from 0 to allowed_fail_cnt. The value of this field resets to 0 after a first successful OS ping, and starts to increment after a first failed OS ping (the value is increased only if OS ping fails and at least one of the links is active).

used_bullets—the number of link resets (including the first reset) since the moment first allowed reset was done (since bullet_fire_stamp). Will reset to 0 after bullet_lease_sec.

bullet_fire_stamp—the time, when a first link reset was issued within allowed time frame or zero.

os_probe_state_change_cb—the callback that will be called upon successful or failed first ping. The parameter probe_ok specifies whether transition of OS probe status to FAILED or OK. NULL value means no callback will be called.

link_reset_cb—the callback that will be called when a decision to reset the link is made. The parameter reset_called specifies whether reset was done or not (due to exhausted bullets). NULL value means no callback will be called.

os_probe_ok—the state of OS probe during the last iteration.

single_port—defines whether monitored module has one path (point-to-point connections, like in POD), or two paths (like in RACK). Monitoring code takes this value into account.

next_first_path—defines which path index (0 or 1) to probe first during the next iteration. This field is updated by the monitoring code.

The context structure is defined to be easily accessible from a different context, which allows a "trace" window into monitoring context. The call to end_point_crash_detect_loopo API continuously monitors a single destination module. The monitoring flow is described below. Before monitoring is started, the monitoring parameters and addressing information are set in the monitoring context. The value of used bullets and the first bullet stamp are set to zero, and the value for the next path index to probe is set to zero as well. The value of os_probe_ok is set to true.

1. When monitoring loop is started, it first copies the address information to a private data structure.

2. Then, the monitoring loop proceeds to testing the remote module OS status and the status or remote module IB link. The probe is done using a direct path and MAD handle identified by next path index (next_first_path). The OS probing is done using sm_info_ping( ) API, using a value of timeout equal to os_probeto_ims. If OS ping succeeds, a conclusion is made that remote port has link, and remote OS is alive. If OS ping times out, the code proceeds to determining the state of the link. The link is checked using query_port_info( ) API for port rem_port on the destination, that is one hop prior to the previously used path. The link check uses the same MAD handle, and the value of timeout equal to link_probe_to_ms.

3. The monitoring code examines remote module probe status. If OS probe was successful, the link code proceeds to step 4. If OS ping fails, and probing the link returns failure, the code proceeds to step 5. The last decision is a design point that wants to minimize false positive detection and requires the nearest side of the link (switch for RACK systems or module for POD systems) to not be the source of MAD errors. If OS ping fails and probing link returns success, the code proceeds to step 6.

4. If OS ping status was successful, the code checks whether os_probe_state_change_cb callback shall be invoked. The callback will be invoked if its value is not NULL, and the value of os_probe_ok is false. Following that, the code proceeds to next step 5.

5. At this step, the code prepares to start a new monitoring cycle. The code flips the value of the next_first_path, unless single_port is specified (0→1 and 1→0). Following that, the code sets the os_probe_ok to true value, sets actual_fail_cnt field to zero and restarts the monitoring loop after probe_interval_ms milliseconds, returning to step 1.

6. If link probe succeeds, the code examines the state of the link. If the link is active, the code proceeds to step 7. If the link is not active, the code proceeds to step 8.

7. At this step, the code has determined that the link state is active, and there is a possibility of crashed OS presence with links in active state. The code then checks whether there is an additional path towards the monitored module to check. Additional path is not available if single_port parameter is set, or if the other path has been already checked. If there is no additional path to check, the code proceeds to step 9. If additional path is available, the code proceeds to step 8.

8. This step is reached on RACK systems only, which use two paths to monitor the module. At this step, the code has determined that OS probe fails via the first path, and the link on the first path is either down or in ACTIVE state. This is not sufficient to decide on the recovery action, because the monitoring logic requires positive detection of the problem via both ports of the monitored module. Hence, the code resets the value of the next_first_path, and proceeds to step 2.

9. At this step, the code sets the value of os_probe_ok to false and checks whether os_probe_state_change_cb callback shall be invoked. The callback will be invoked if its value is not NULL, and the value of os_probe_ok was true. Following that, the code proceeds to next step 10.

10. At this step, the code makes a decision whether the monitored module is a crashed module with IB links in active state. The module is a crashed module with IB links in active state, if at least one of the links that connect to the monitored module is in active state. If module is NOT a crashed module with IB links in active state, the code resets actual_fail_cnt field to zero and proceeds to step 16. Otherwise, the code proceeds to step 11.

11. At this step, the code has determined that a crashed module with active IB links is detected. The code increments the count of actual_fail_cnt. If the incremented value is below the value of allowed_fail_cnt, the code proceeds to step 16. Otherwise, the code proceeds to step 12.

12. At this point, the code has determined that a recovery action (link reset is needed). The code resets actual_fail_cnt field to zero, and checks whether used_bullets value is below allowed_bullets value. If the used_bullets value is below allowed_bullets value, the code proceeds to step 15. Otherwise, the code proceeds to step 13.

13. At this step, the code checks, whether the current time stamp is above bullet_fire_stamp+bullet_lease_sec. If the value of current time stamp is greater, the code resets used_bullets value to zero and proceeds to step 15. Otherwise, the code proceeds to step 14.

14. At this step, the code executes link_reset_cb callback, with the value of reset_called parameter set to false, provided the value of the callback is not NULL and proceeds to step 16.

15. At this step, the code takes a recovery action, resetting IB links on a crashed module. All IB links of a monitored module are reset, using provided path information. Same path and MAD handle are used as for querying the link state. The code uses reset_port( ) API with a timeout value of link_reset_to_ms. The API uses Set method of SM PortInfo MAD to disable and then enable the physical property of the link, causing a link reset. Reset of the physical link will quickly propagate across logical (software) layer, allowing application to reset connections and flush pending IO transactions. Furthermore, since SM component of A9000 will not enable the logical property of the link on non-responding modules, the logical links of a crashed module will remain down. Reset method of recovery as opposed to link disable is a design point to minimize the effect of false positive detection. If code resets links for a busy but alive module, SM component will reactivate the logical property of IB links, once physical link is negotiated, and the software on the monitored module starts responding. Following this step, the code proceeds to step 16.

16. At this step, the code restarts the monitoring with a decreased monitoring timeout. The code flips the value of the next_first_path, unless single_port is specified (0→1 and 1→0). Following that, the code restarts the monitoring loop after failed_probe_interval_ms milliseconds, returning to step 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method, comprising:
   determining whether an operating system of a node of a distributed computing environment is functioning correctly by sending a first management query to the node;
   in response to determining that the operating system of the node is not functioning correctly, determining whether the node has an active communication link by sending a second management query to ports associated with the node; and
   in response to determining that the node has an active communication link, resetting the active communication link for the node by sending a reset request to the ports associated with the node.

2. The computer-implemented method of claim 1, wherein the first management query is directly sent from a first node of the distributed computing environment to a second node via a point-to-point connection between the first node and the second node.

3. The computer-implemented method of claim 1, wherein the first management query is indirectly sent from a first node of the distributed computing environment to a second node via a switch located between the first node and the second node.

4. The computer-implemented method of claim 1, wherein the first management query is sent by a first node to a second node in response to determining that the second node is a neighbor node to the first node.

5. The computer-implemented method of claim 1, wherein the first management query includes a fabric management query that terminates within the operating system of the node.

6. The computer-implemented method of claim 1, wherein it is determined that the operating system of the node is not functioning correctly in response to determining that a response to the first management query has not been received from the node within a predetermined time period.

7. The computer-implemented method of claim 1, wherein in response to determining that the operating system of the node is not functioning correctly, all ports associated with the node are probed to determine whether any ports of the node are present and active, the probing including sending the second management query that asks the ports associated with the node whether the node has an active communication link.

8. The computer-implemented method of claim 1, wherein it is determined that the node has an active communication link in response to identifying an active port within the node in response to the second management query.

9. The computer-implemented method of claim 1, wherein in response to determining that the operating system of the node is not functioning correctly, and the node also has an active communication link, a predetermined count is incremented, and monitoring of the node is performed with a greater frequency.

10. The computer-implemented method of claim 1, wherein the reset request causes the ports associated with the node to reset all active links within the node.

11. The computer-implemented method of claim 1, wherein each node within the distributed computing environment is designated a monitoring node.

12. The computer-implemented method of claim 1, wherein a monitoring node within the distributed computing environment is only allowed to send a predetermined number of reset requests to another node within a predetermined time period.

13. The computer-implemented method of claim 1, wherein the first management query and the second management query are both high-priority queries.

14. The computer-implemented method of claim 1, wherein the first management query also determines whether a network adapter of the node is operational.

15. A computer program product for fencing non-responding ports in a network fabric, the computer program product comprising a computer readable storage medium having program instructions embodied therewith, wherein the computer readable storage medium is not a transitory signal per se, the program instructions executable by a processor to cause the processor to perform a method comprising:
   determining whether an operating system of a node of a distributed computing environment is functioning correctly by sending a first management query to the node, utilizing the processor;
   in response to determining that the operating system of the node is not functioning correctly, determining whether the node has an active communication link by sending a second management query to ports associated with the node, utilizing the processor; and
   in response to determining that the node has an active communication link, resetting the active communication link for the node by sending a reset request to the ports associated with the node, utilizing the processor.

16. The computer program product of claim 15, wherein the first management query is directly sent from a first node of a distributed computing environment to a second node via a point-to-point connection between the first node and the second node.

17. The computer program product of claim 15, wherein the first management query is indirectly sent from a first node of a distributed computing environment to a second node via a switch located between the first node and the second node.

18. The computer program product of claim 15, wherein the first management query is sent by a first node to a second node in response to determining that the second node is a neighbor node to the first node.

19. The computer program product of claim 15, wherein the first management query includes a fabric management query that terminates within the operating system of the node.

20. The computer program product of claim 15, wherein it is determined that the operating system of the node is not functioning correctly in response to determining that a response to the first management query has not been received from the node within a predetermined time period.

21. The computer program product of claim 15, wherein the second management query asks the ports associated with the node whether the node has an active communication link.

22. A system, comprising:
   a processor; and
   logic integrated with the processor, executable by the processor, or integrated with and executable by the processor, the logic being configured to:
   determine whether an operating system of a node of a distributed computing environment is functioning correctly by sending a first management query to the node;
   in response to determining that the operating system of the node is not functioning correctly, determine whether the node has an active communication link by sending a second management query to ports associated with the node; and in response to determining that the node has an active communication link, reset the active communication link for the node by sending a reset request to the ports associated with the node.

23. A computer-implemented method, comprising:

sending a first management query from a first node of a distributed computing environment to a second node of the distributed computing environment, where the first management query is associated with an operating system of the second node;

in response to a failure to receive, at the first node, a response to the first management query from the second node, sending, from the first node to one or more communication ports associated with the second node, a second management query; and in response to receiving, at the first node, a response to the second management query from the one or more communication ports associated with the second node indicating that the second node has an active communication link, sending, by the first node to the one or more communication ports associated with the second node, a link reset request to reset the one or more communication ports of the second node with the active communication link.

24. The computer-implemented method of claim 23, wherein a plurality of additional nodes is included with the first node and the second node within the distributed computing environment, and each of the nodes within the distributed computing environment monitors neighboring nodes utilizing the first management query and the second management query.

25. A computer-implemented method, comprising:

determining whether an operating system of a node of a distributed computing environment is functioning correctly by sending a first management query to the node;

in response to determining that the operating system of the node is not functioning correctly, determining whether the node has an active communication link by sending a second management query to ports associated with the node; and in response to determining that the node has an active communication link, incrementing a predetermined count and performing monitoring of the node with greater frequency;

in response to determining that the predetermined count exceeds a threshold, flagging the node and resetting the active communication link for the node by sending a reset request to the ports associated with the node.

* * * * *